Patented Apr. 14, 1925.

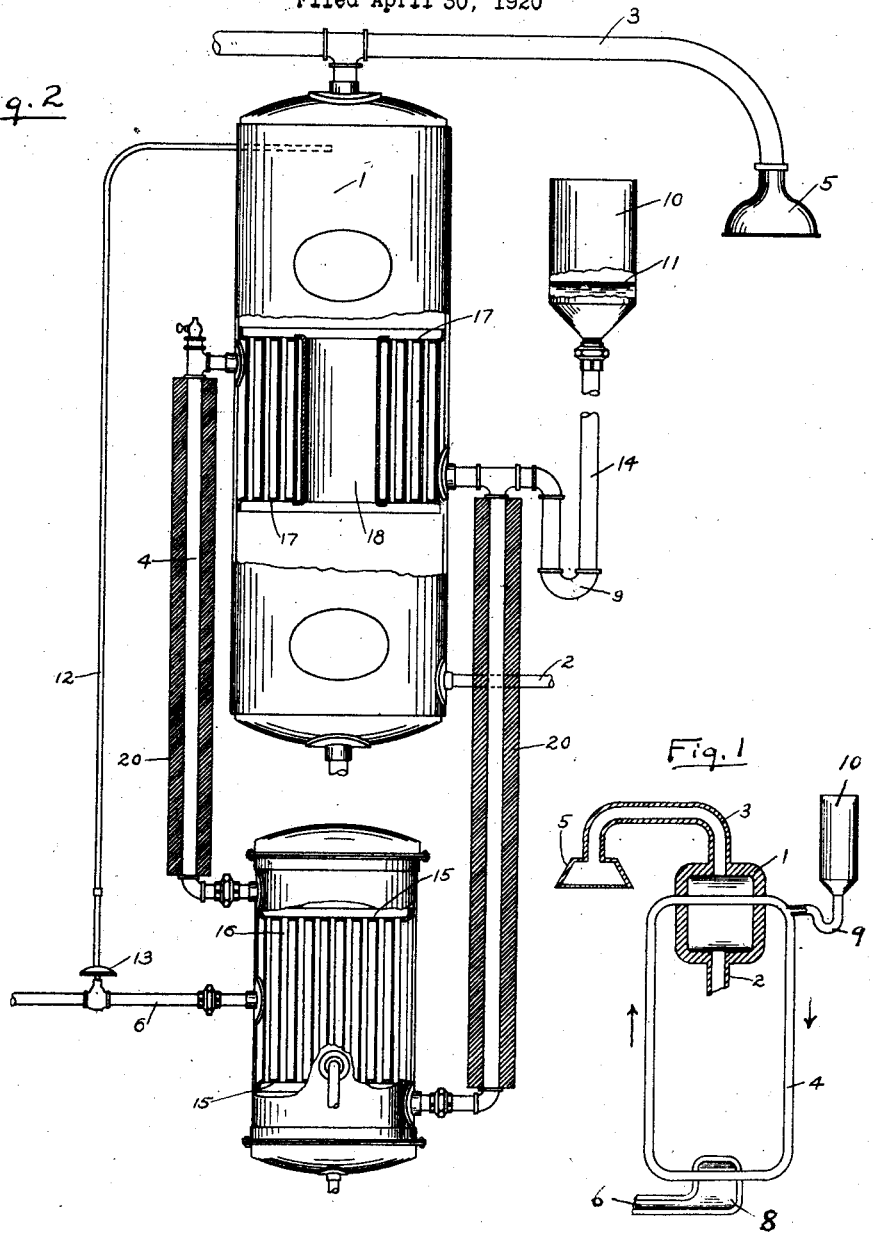

1,533,463

UNITED STATES PATENT OFFICE.

FRED J. POSTEL, OF CHICAGO, ILLINOIS.

TEMPERATURE-LIMITING HEATER.

Application filed April 30, 1920. Serial No. 378,002.

*To all whom it may concern:*

Be it known that I, FRED J. POSTEL, citizen of the United States, residing at Chicago, in the county of Cook and State of Illinois, have invented certain new and useful Improvements in a Temperature-Limiting Heater; and I do hereby declare the following to be a full, clear, and exact description of the invention, such as will enable others skilled in the art to which it appertains to make and use the same.

In its general aspects, my invention relates to heating appliances and aims to provide methods and means whereby the effective heating can easily and positively be limited to some predetermined temperature below that which might be directly obtainable from the source of heat. For this general purpose, my invention aims to provide simple, easily installed and entirely automatic intermediary means between the source of heat and the object which is to be heated, to arrange the intermediary means in such a manner that it will normally be highly effective in transferring heat from the source of the latter to the object which is to be heated, and to provide automatic means for rendering the intermediary means inoperative as to the transferring of heat above a predetermined temperature. Furthermore, my invention aims to provide simple means for controlling the predetermined temperature to which the heating effect on the object is to be limited, and to provide means automatically responsive to the attained temperature of the heated object for controlling the supply of the heat.

In many classes of manufacturing, as well as in hydro-therapeutics, it is necessary to heat objects (such as certain classes of liquids) to given temperatures and it is highly important that these temperatures should not be materially exceeded. For example, in certain chemical operations the result will be materially altered if the heating of the liquid is carried beyond a predetermined point. Likewise, in heating water for hydro-therapeutic treatments, the effect on the patient may be disastrous if the heating is carried beyond a given temperature.

To avoid such excessive temperatures, it has been customary in hydro-therapeutic installations to employ various types of thermostatic valves actuated by the temperature of the liquid which is being heated, and to arrange such valves so that they will control the supply of heat. Ordinarily, such thermostatic arrangements can be made to serve this purpose nicely, but impurities in the liquid sometimes clog the mechanism used for this purpose and even a slight deposit of scale may so derange such a controlling mechanism as to permit an excessive temperature to be attained. Consequently, many valuable batches of liquids have been spoiled in this way in manufacturing processes, while in the case of hydro-therapeutic appliances a derangement of the controlling valves has often caused a painful scalding of the patients or even a killing of the latter.

To avoid such mishaps, my invention aims to provide a heating apparatus and a heating method in which the heat is effectively transferred from the source to the liquid or other object which is to be heated by means which are arranged so as to maintain their effective heat-transferring operation only up to some predetermined temperature. It also aims to accomplish further objects which will appear from the following specification and from the accompanying drawings. In these drawings, Fig. 1 is a diagrammatic view showing an apparatus employing my invention and arranged for heating the supply of water to a shower bath.

Fig. 2 is a vertical section through an apparatus for this same purpose, showing also the arrangements for normally controlling the supply of heat and for varying the obtainable predetermined temperature.

In the simplified diagrammatic view of Fig. 1, a heating tank 1 is interposed between a cold water inlet 2 and an outlet pipe 3, and the water in this tank is heated by a fluid in a pipe passing through this tank, so as to furnish hot water through the outlet pipe for any desired purpose, as for example to a shower head 5. According to the methods heretofore in use, the desired heating effect would be secured by attaching the fluid supply pipe to a source of steam, but this is objectionable for the reason that unless the supply of steam is adequately controlled at all times, the temperature of the water issuing from the tank may rise to a dangerously high point. To avoid such an occurrence, I do not connect the heating element (here shown as a single pipe portion extending transversely through the heating tank) directly to the source of steam, but convey the heat from the supply of steam to the coil 4 through a liquid which acts as an intermediary and which continuously circulates through the coil 4 and in heat conducting relation to some portion of the steam supply pipe 6. For this purpose, I am here showing a part of the steam supply pipe 6 as connected to the casing 8 which forms the primary heater of my appliance. Then I connect this casing 8 with the tank 1 by means of a loop of piping 4 extending through both and forming an endless tubular member through which liquid can continuously circulate as shown by the arrows in the diagram. This tubular member 4 is normally filled with a liquid having a boiling point corresponding substantially to the maximum temperature which is to be allowable in the secondary heater of which the tank 1 forms the casing. For example, where water is to be supplied to a shower bath, so that the temperature limit should be approximately 120° F., I may employ methylal which boils at about 125° Fahrenheit, while for other purposes I would select other liquids having boiling points similarly approximate to the desired limiting temperatures.

The tank 1 is above the primary heater casing 8, so that convection will cause the liquid to circulate in the endless tubular member. Then I provide an expansion chamber 10 for this endless tubular member and preferably connect this to the loop 4 near its upper or heat-transferring portion. For example, I may connect this loop through a U-tube 9 to an expansion chamber 10 in which the exposed top of the liquid is normally sealed against atmospheric evaporation by a layer of oil 11.

Thus arranged, it will be obvious from the diagram that the steam supplied through the pipe 6 will heat the methylal in the casing 8, thereby causing this to circulate through the endless coil 4 and to convey heat to the water in the tank 1. As long as absorption of the heat from the coil 4 is at least at a rate proportionate to the supply of the steam, so that the liquid in the coil 4 remains below 125°, the methylal will act simply as a heat transferring intermediary. However, if the supply of steam to the casing 8 is too great in proportion to the amount of water which is being heated in the tank 1, so that the temperature in the coil 4 exceeds 125°, the methylal will begin to boil or vaporize and the pressure due to the vaporizing will force the resulting vapor through the U-tube and the liquid seal, so that it will issue into the vent chamber 10, where it can freely expand without damaging the apparatus. Should this excessive heating be prolonged, the liquid in the endless tubular intermediary member will be gradually vaporized and expelled through the open top or vent opening of the expansion chamber 10, thereby permanently interrupting the connection between the primary heater and the secondary heating appliance. While this vaporizing continues, the freedom with which the vapor can be expelled through the vent will prevent the vapor from increasing materially in either pressure or temperature, so that the effect on the water in the tank 1 will still be restricted substantially to the boiling point of the intermediary liquid.

In practice, I preferably do not depend on a manual control for regulating the supply of heat to the primary heater, which supply is here mentioned as being in the form of steam, but preferably provide an automatic control for this supply. For example, in Fig. 2 of the drawings, the interior of the hot water tank 1 is connected through a pipe 12 with a thermostatic valve 13 forming part of the inlet pipe 6 for the supply of steam. This valve construction (which need not here be described, as valves for this purpose are familiar to those interested in appliances of this general class) controls the supply of steam automatically in response to the temperature of the water in the tank 1. In other words, it makes the supply of heat to the primary heater automatically responsive to the temperature attained through the action of the intermediary heat-conveying liquid in the secondary or heat-transferring appliance. As long as this valve is carefully adjusted and properly working, the desired temperature for the water which is being heated will therefore be maintained with a minimum of expenditure of steam. However, if the valve should become clogged by scale deposits or otherwise, or for any other reason should fail to function properly, the vaporizing of the intermediary liquid will prevent this liquid from reaching an unduly high temperature and will therefore prevent the water in the tank 1 from being heated to an undesirable degree by the transfer of heat to the same.

Where limiting temperatures other than 120° F. are desired, I operate in a similar manner by substituting for the methylal some other liquid which vaporizes at a temperature corresponding to the desired limit. Moreover, I can increase the limiting effect of any given liquid to some extent by lengthening the pipe 14 leading to the vent chamber 10 and increasing the height of the oil seal 11 above the top of the endless tubular member. By doing so, I produce a pressure on the liquid corresponding to the head thus attained and consequently raise the vaporizing point of the liquid in proportion to this pressure.

In practice, I desirably employ arrangements for both the primary and secondary heaters which will offer larger heat-conducting surfaces than would be secured with the straight loop pipe portions shown in the diagram of Fig. 1. For example, I may introduce the steam from the inlet 6 between heads 15 disposed across the primary heater drum 8 and may circulate the intermediary liquid through vertical tubes 16 extending through perforations in these two heads. Likewise, I may circulate the intermediary liquid between heads 17 disposed across the hot water tank 1 and connected by tubes 18 through which the water will pass from the bottom to the top of the tank. However, while I have illustrated such features of a practical embodiment of my invention in Fig. 2, I do not wish to be limited to the details of the construction and arrangement here disclosed, nor to the employment of any particular liquids nor to the use of my method and appliance for any particular purpose. Obviously, both the purpose and the limiting temperature may readily be varied, while numerous additions, omissions or other changes might be made without departing from the spirit of my invention or from the appended claims. For example, the major portion of the tubular member 4 disposed between the primary and secondary heat-transmitting parts of my appliance are desirably covered with a heat-insulating material 20.

I claim as my invention:—

1. A device for heating a liquid to a predetermined temperature below its boiling point, including in combination with a source of heat, an endless tubular liquid receiving member having a part to receive heat from said source and a part to conduct heat to the first named liquid, a liquid in said member rapidly vaporizable substantially at the said predetermined temperature, an expansion tank freely open to the air and communicating with the endless liquid receiving member, and a layer of oil on the surface of the liquid in the tank for normally forming an air seal to prevent evaporation, the oil being unaffected by the liquid and adapted to permit the vaporized liquid to escape to the open air and thereby permanently interrupt the operative connection between the source of heat and the first named liquid so as to prevent heating of said liquid beyond the predetermined temperature.

2. A device for heating a liquid to a predetermined temperature below its boiling point, including in combination with a source of heat, an endless tubular liquid receiving member having a part to receive heat from said source and a part to conduct heat to the first named liquid, a liquid in said member rapidly vaporizable substantially at the said predetermined temperature, and a liquid seal interposed between the liquid and the outer air to permit the vaporized liquid upon exceeding said temperature to escape to the open air, whereby to permanently interrupt the operative connection between the source of heat and the first named liquid to be heated, so as to prevent heating of said liquid beyond the predetermined temperature.

Signed at Chicago, Illinois, April 27th, 1920.

FRED J. POSTEL.